United States Patent [19]
Yasuda et al.

[11] Patent Number: 5,955,182
[45] Date of Patent: Sep. 21, 1999

[54] HEAT RESISTING MEMBER AND ITS PRODUCTION METHOD

[75] Inventors: Kazuhiro Yasuda; Seiichi Suenaga, both of Yokohama; Kunihiko Wada, Kawasaki; Hiroki Inagaki, Yokohama; Masako Nakahashi, Tokyo, all of Japan

[73] Assignee: Kabushiki Kaisha Toshiba, Japan

[21] Appl. No.: 08/794,068

[22] Filed: Feb. 4, 1997

[30] Foreign Application Priority Data

Feb. 5, 1996 [JP] Japan .................................. 8-018565

[51] Int. Cl.⁶ .................................................. B32B 15/04
[52] U.S. Cl. ........................ 428/217; 428/212; 428/216; 428/156; 428/334; 428/336; 428/469; 428/472; 428/623; 428/632; 428/698; 428/701; 428/702; 428/697; 428/699
[58] Field of Search ..................... 428/632, 623, 428/472, 469, 216, 334, 336, 701, 702, 698, 212, 217, 156

[56] References Cited

U.S. PATENT DOCUMENTS

| | | | |
|---|---|---|---|
| 4,095,003 | 6/1978 | Weatherly et al. | 428/632 |
| 4,269,903 | 5/1981 | Clingman et al. | 428/472 |
| 4,321,311 | 3/1982 | Strangman | 428/472 |
| 4,335,190 | 6/1982 | Bill et al. | 428/623 |
| 4,676,994 | 6/1987 | Demaray | 427/42 |
| 5,015,502 | 5/1991 | Strangman et al. | 427/42 |
| 5,512,382 | 4/1996 | Strangman | 428/632 |
| 5,630,314 | 5/1997 | Kojima et al. | 416/241 B |
| 5,652,044 | 7/1997 | Rickerby | 428/216 |

FOREIGN PATENT DOCUMENTS

| | | |
|---|---|---|
| 60-25743 | 2/1985 | Japan . |
| 61-96064 | 5/1986 | Japan . |

*Primary Examiner*—Archene Turner
*Attorney, Agent, or Firm*—Finnegan, Henderson, Farabow, Garrett & Dunner, L.L.P.

[57] ABSTRACT

A heat resisting member having ceramics heat shield layers which is directly formed on a metal base material or formed on it via a metal bonded layer formed on the metal base material. The ceramics heat shield layers comprise a first ceramics layer which is formed on the metal base material or the metal bonded layer and has a high elastic modulus, high hardness and high density, and a second ceramics layer which is formed on the first ceramics layer and has a low elastic modulus, low hardness and low density. Delamination from the neighborhood of the interface or oxidation of the lower layer can be prevented by the first ceramics layer which is formed on the metal base material or the metal bonded layer. Thermal shock resistance and heat shielding effect of the ceramics heat shield layers as the whole can be enhanced by the second ceramics layer. And, if necessary, a third ceramics layer having a high elastic modulus, high hardness and high density may be formed on the second ceramics layer in order to improve the abrasion resistance and the resistance against a damage due to flying substances.

14 Claims, 2 Drawing Sheets

HEAT RESISTING MEMBER AND ITS PRODUCTION METHOD

BACKGROUND OF THE INVENTION

1. Field of the Invention

The present invention relates to a heat resisting member which is superior in thermal fatigue resistance, thermal shock resistance and oxidation resistance, and to its production method.

2. Description of the Related Art

In order to enhance the efficiency of high temperature apparatuses represented by a gas turbine for power generation and engines, temperatures at which such components are used are being raised. Accordingly, materials for the component parts of high temperature apparatuses are being required to have enhanced properties, such as a high temperature strength, a high-temperature corrosion resistance and a high-temperature oxidation resistance.

Accordingly, members now being used extensively have a corrosion-resistant and oxidation-resistant metal coating applied onto the surface of a high-strength Ni-based super alloy or Co-based super alloy. And, to enable the use under environments at higher temperatures, a thermal shield coating which enhances the efficiency of cooling a base material has been developed by forming a ceramics layer having a low heat conductivity on the surface of the metal coating. Members applied with such a thermal shield coating are being placed in practical use for, e.g., stationary blades for a gas turbine to be exposed to a low stress loading.

In the above-described heat shield coating, the metal layer to be formed between the base material and the ceramics layer provides a corrosion and oxidation resistance as the metal coating and also relieves a thermal stress produced due to a difference of the thermal expansion coefficients between the base material and the ceramics layer. For such a metal bonded layer, an M—Cr—Al—Y alloy (M is at least one element selected from the group consisting of Fe, Ni, or Co) is often used.

On the other hand, for the ceramics heat shield layer forming the outermost layer, zirconia (stabilized zirconia) which is stabilized by adding rare earth oxide or alkaline earth oxide is used most extensively. Among other ceramics materials, stabilized zirconia has a higher thermal expansion coefficient and also a lower thermal conductivity.

To form the above-described heat shield coating, various types of coating techniques may be adopted. Among such techniques, a plasma spray coating method is used extensively. The plasma spray coating method has advantages that it can use various types of coating materials, its film forming rate is fast, and a thick film can be formed.

However, the conventional ceramics heat shield layer formed by the plasma spray coating method has a disadvantage of being fractured or delaminated easily when it is used for a long period under the environment of causing thermal cycling. It is because cracks are readily formed inside the spray coated layer and such cracks tend to further propagate. Cracks are particularly formed in the neighborhood of the interface with the metal bonded layer where a thermal stress is concentrated. Those cracks formed in the neighborhood of the interface are the main cause of the fractures or delamination of the spray coated layer.

In addition, the ceramics heat shield layer formed by the plasma spray coating method has a disadvantage that the metal bonded layer is easily oxidized when it is used in the oxidizing atmosphere at a high temperature for a long time of period. Such oxidation is caused due to the configuration particular to the spray coated layer. Since a stress is produced as the metal bonded layer is oxidized, the ceramics heat shield layer is separated from the interface with the metal bonded layer.

Furthermore, in the actual environment of using a gas turbine or the like, there is a disadvantage that its members are abraded or damaged due to the collision of large particles or the like. Particularly, the ceramics heat shied layer formed by the plasma spray coating method is heavily damaged by the collision of such large particles, and its surface is readily abraded or damaged. Generally, the spray coated layer has large projections and depressions on its surface, and the adhesion of mutual particles inside the layer is low.

Meanwhile, it is considered to form the ceramics heat shield layer by physical-chemical vapor deposition methods which are represented by an electron beam PVD method (EB-PVD method). But, such film forming methods have disadvantages that a film forming rate is low and a production cost is high as compared with the spray coating method. Besides, when the ceramics heat shield layer formed by a PVD method or a CVD method is used solely, its heat shield effect is low (due to low porosity), and cracks are readily and suddenly formed due to a thermal shock or the like.

As described above, as a method for forming a ceramics layer which serves as a heat shield layer, the plasma spray coating method or the physical-chemical vapor deposition methods which are represented by the EB-PVD method are being used, but such methods have advantages and disadvantages. Therefore, there has not been provided ceramics heat shield layer which satisfies a heat resistant cycling property and a thermal shock resistance of the ceramics heat shield layer, oxidation inhibiting and heat shield effects of a lower layer such as the metal bonded layer, an abrasion resistance, and a resistance to damages due to the collision of flying subjects.

SUMMARY OF THE INVENTION

Accordingly, an object of the invention is to provide a heat resisting member, which can be used for a long time of period under working environments where a temperature is high and thermal cycling and thermal shocks are applied, by using ceramics heat shield layer which excels in thermal fatigue resistance and thermal shock resistance properties. Another object of the invention is to provide a heat resisting member provided with a further improved thermal fatigue resistance property by preventing the lower layer such as a metal bonded layer from being oxidized. Still another object of the invention is to provide a heat resisting member provided with an improved abrasion resistance and an improved resistance against a damage due to the collision of flying objects.

A heat resisting member according to the invention comprises a metal base material, and ceramics heat shield layers which is ceramics heat shield layers directly formed on the metal base material or formed on it via a metal bonded layer formed on the metal base material and includes a first ceramics layer having a high elastic modulus of $E_1$ and formed on the metal base material or the metal bonded layer and a second ceramics layer which is formed on the first ceramics layer and has a low elastic modulus $E_2$ satisfying $E_2 < E_1$.

Another heat resisting member according to the invention comprises a metal base material, and ceramics heat shield layers which is ceramics heat shield layers directly formed on the metal base material or formed on it via a metal bonded layer formed on the metal base material and includes a first ceramics layer having a high hardness $H_1$ and formed on the metal base material or the metal bonded layer and a second ceramics layer which is formed on the first ceramics layer and has hardness $H_2$ satisfying $H_2<H_1$.

Still another heat resisting member according to the invention comprises a metal base material, and ceramics heat shield layers which is ceramics heat shield layers directly formed on the metal base material or formed on it via a metal bonded layer formed on the metal base material and includes a first ceramics layer having a relative density of 88% or more and formed on the metal base material or the metal bonded layer and a second ceramics layer formed on the first ceramics layer and having a relative density of less than 88%.

In the heat resisting member according to the invention, a third ceramics layer having a high elastic modulus $E_3$ satisfying $E_3>E_2$ may be formed on the second ceramics layer.

A method for producing a first heat resisting member according to the invention has a step to form a first ceramics layer directly on a metal base material or via a metal bonded layer formed on the metal base material by one film forming method selected from the group consisting of a PVD method, a CVD method or a spin coating method, and a step to form a second ceramics layer on the first ceramics layer by a spray coating method.

A method for producing a second heat resisting member has a step to form a first ceramics layer directly on a metal base material or via a metal bonded layer formed on the metal base material by a high-density spray coating method using fine particle powder, and a step to form a second ceramics layer on the first ceramics layer by a low-density spray coating method using coarse powder.

In the heat resisting member according to the invention, the first ceramics layer having a high elastic modulus and high hardness is disposed on the metal base material or the metal bonded layer. This first ceramics layer is provided with a high strength thanks to its high elastic modulus and high hardness. Accordingly, the ceramic heat shield layers can be provided with an enhanced fracture resistance and delamination resistance. In other words, a thermal stress to the ceramics heat shield layer is concentrated on the neighborhood of the interface with the metal base material or the metal bonded layer. By providing the first ceramics layer having the high strength in the neighborhood of the interface, it is possible to prevent cracks or fractures from occurring in the neighborhood of the interface of the ceramics heat shield layer. Therefore, it is possible to prevent the ceramics heat shield layer from being delaminated due to such a cause.

When the ceramics heat shield layer is thoroughly formed of the ceramics layer having a high elastic modulus and high hardness, a stress produced inside the ceramics layer when thermal cycling or the like is applied becomes great, so that cracks are suddenly propagated due to a thermal shock or a thermal stress, resulting in causing fractures. On the other hand, the present invention forms on the first ceramics layer the second ceramics layer having the low elastic modulus and low hardness, so that the produced stress of the ceramics heat shield layers as the whole can be made low. Therefore, it is possible to control the fractures of the ceramics heat shield layers due to a thermal shock or a thermal stress.

The elastic modulus and hardness of the ceramics highly depend on its density. Therefore, the relative density has a different suitable value depending on the ceramics material, when the first ceramics layer is formed of a high-density ceramics layer having a relative density of 88% or more and the second ceramics layer is formed of a low-density ceramics layer having a relative density of less than 88%, the first ceramics layer having a high elastic modulus and high hardness and the second ceramics layer having a low elastic modulus and low hardness can be achieved easily when the ceramics layer is zirconia, the above-described relative density is suitable.

Besides, the first ceramics layer having the high density serves to control the oxidation of the metal base material or the metal bonded layer. Therefore, by a stress produced according to the oxidation of the metal base material or the metal bonded layer, delamination from the neighborhood of the interface of the ceramics heat shield layer can be controlled more effectively. The second ceramics layer having the low density excels in thermal shielding. Accordingly, a sufficient thermal shielding effect can be obtained.

By forming the third ceramics layer having a high elastic modulus on the outermost surface, the abrasion resistance of the surface and resistance against a damage due to the collision of scattered substances can also be improved at the same time.

DETAILED DESCRIPTION OF THE PREFERRED EMBODIMENTS

Preferred embodiments according to the invention will be described with reference to the accompanying drawings.

Figure 1:
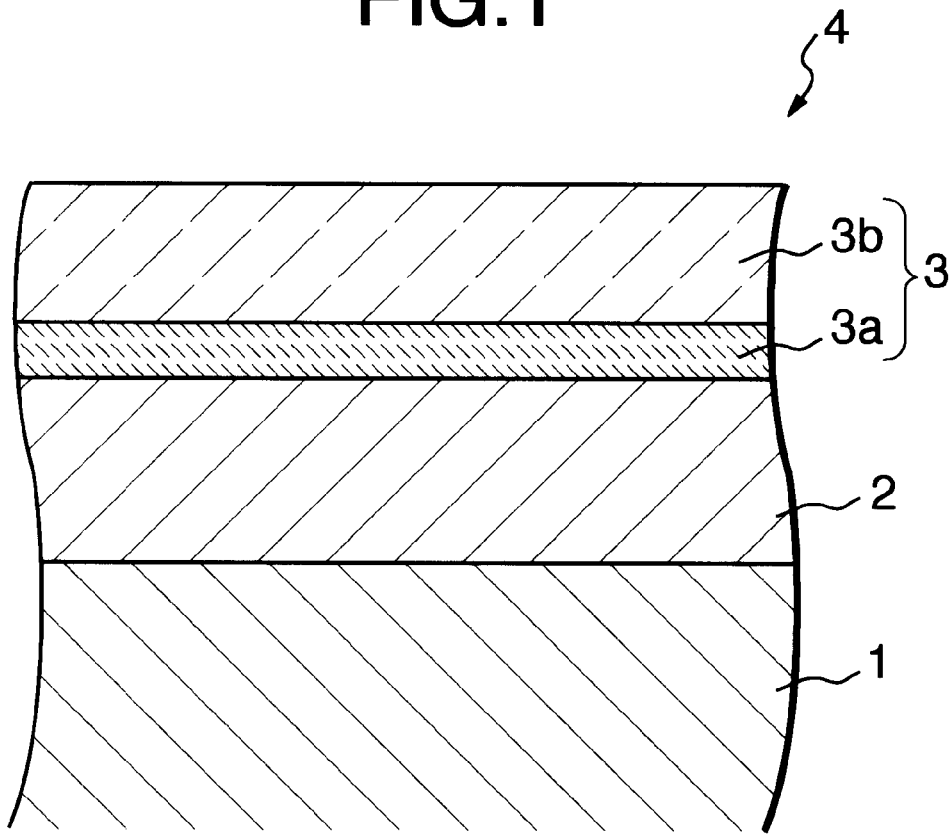
FIG. 1 is a sectional view showing a configuration of the heat resisting member according to one embodiment of the present invention.

FIG. 1 is a sectional view of the major configuration of the heat resisting member according to one embodiment of the invention. In the drawing, reference numeral 1 denotes a metal base material which may be a heat resisting alloy having as the major component at least one element selected from the group consisting of Fe, Ni, or Co. The metal base material 1 can be selected appropriately from various types of heat resisting alloys according to the uses. In view of practical use, it is preferable to use Ni-based super heat resisting alloys such as IN738, IN738LC, IN939, Mar-M247, RENE80, CM-247, CMSX-2 and CMSX-4, and Co-based super alloys such as FSX-414 and Mar-M509.

Figure 2:
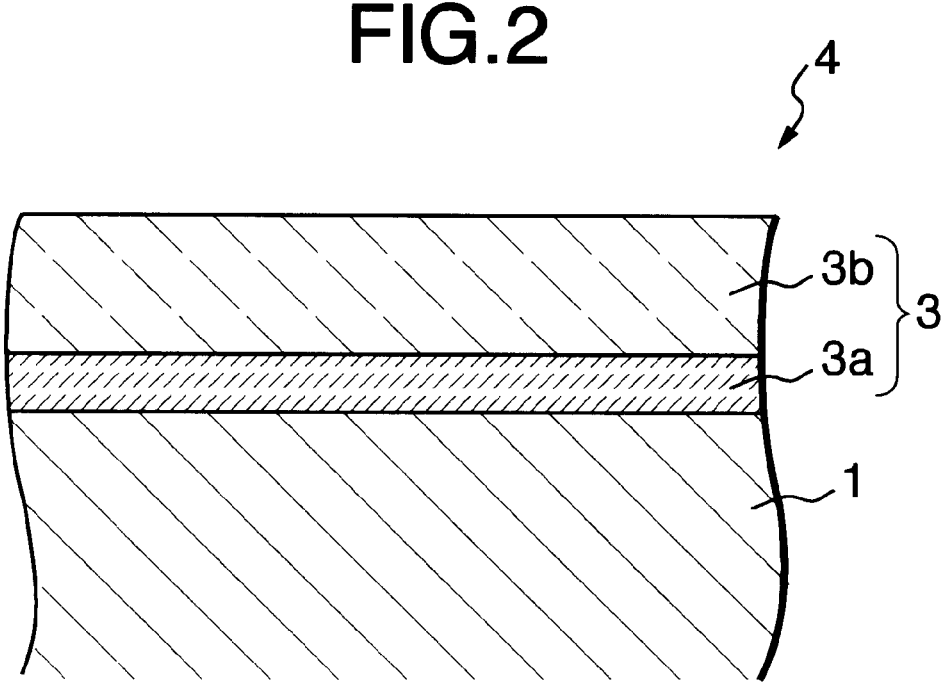
FIG. 2 is a sectional view showing a configuration of the heat resisting member according to another embodiment of the present invention.

The surface of the metal base material 1 is coated with a metal bonded layer 2 which excels in corrosion resistance and oxidation resistance and has a thermal expansion coefficient intermediate between those of the metal base material 1 and ceramics heat shield layers 3 to be descried afterward. The metal bonded layer 2 is made of, e.g., an M—Cr—Al—Y alloy (M is at least one element selected from the group consisting of Fe, Ni, or Co). The ceramics heat shield layers 3 can be directly coated onto the metal base material 1 as shown in FIG. 2.

The metal bonded layer 2 made of the M—Cr—Al—Y alloy assures the corrosion and oxidation resistances of the metal base material 1 and relieves a thermal stress derived from a difference between the thermal expansion efficiencies of the metal base material 1 and the ceramics heat shield layers 3 as described above. Generally, the M—Cr—Al—Y alloy preferably consists of 0.1 to 20% by weight of Al, 10 to 35% by weight of Cr, 0.1 to 5% by weight of Y, and a balance of at least one element selected from Ni and Co with the above-descried performance taken into account comprehensively. Besides, at least one element selected from the group consisting of Ti, Nb, Hf, Zr, Ta, or W may be added in an amount of 5% by weight or below to the M—Cr—Al—Y alloy depending on the uses.

The metal bonded layer 2 can be formed by a film forming method such as a plasma spray coating method, a high-velocity gas flame spray coating method (HVOF method), a physical vapor deposition method (PVD method), a chemical vapor deposition method (CVD method). And, the plasma spray coating method is most effective in view of practical use. Especially, a vacuum plasma spray coating method which performs a spray coating method in a vacuum atmosphere is preferable among the plasma spray coating methods. Accordingly, the metal bonded layer 2 formed can be inhibited from being oxidized to provide a good oxidation resistance.

The metal bonded layer 2 can have a thickness selected from a range of about 10 to 500 μm according to the uses. For example, a gas turbine blade appropriately has a thickness of about 50 to 300 μm in view of an oxidation life and an effect of relieving a stress between the metal base material 1 and the ceramics heat shield layers 3.

The above-described metal bonded layer 2 (or the metal base material 1) is coated with the ceramics heat shield layers 3. Thus, a heat resisting member 4 which is used as a component for a high temperature apparatus for example is configured.

As the component material for the ceramics heat shield layers 3, it is possible to use various types of ceramics materials such as zirconia ($ZrO_2$), alumina ($Al_2O_3$), alumina-titania mixed oxide ($Al_2O_3$—$TiO_2$), magnesia (MgO), spinel ($MgAl_2O_4$), silicon nitride ($Si_3N_4$), sialon (Si—Al—O—N), aluminum nitride (AlN), titanium nitride (TiN), and silicon carbide (SiC).

Among these ceramics materials, zirconia having a low heat conductivity and a high thermal expansion coefficient is suitable as a component material for the ceramics heat shield layers 3. And, $Y_2O_3$, CaO, MgO and the like are used as a stabilizer for suppressing a phase change of $ZrO_2$. Among them, $Y_2O_3$ is most preferable, and particularly, partly stabilized zirconia containing about 8% by weight of $Y_2O_3$ is provided with a very good property. For a first ceramics layer 3a to be described afterward, alumina, alumina-titania mixed oxide, magnesia and spinel of which a sintered body has an elastic modulus higher than that of zirconia are used preferably.

The ceramics heat shield layers 3 can have a thickness (as the whole) appropriately selected from a range of about 100 to 3000 μm according to the uses. For example, it is desired to have a thickness of about 100 to 300 μm for a gas turbine blade, and a thickness of about 200 to 2000 μm for the inner wall of a combustor.

The above-described ceramics heat shield layers 3 are formed on the metal bonded layer 2 or directly on the metal base material 1, and has the first ceramics layer 3a having a high elastic modulus $E_1$ and a second ceramics layer 3b which is formed on the first ceramics layer 3a and has an elastic modulus $E_2$ satisfying $E_2<E_1$.

Since an elastic modulus is closely related to hardness, the first ceramics layer 3a can be called a high hardness ceramics layer, and the second ceramics layer 3b can be called a low hardness ceramics layer. Hardness $H_1$ of the first ceramics layer 3a and hardness $H_2$ of the second ceramics layer 3b shall be mutually related at least to satisfy $H_1>H_2$.

The first ceramics layer 3a having a high elastic modulus and high hardness as described above is formed on the metal bonded layer 2 or directly on the metal base material 1, so that the ceramics heat shield layers 3 can have its delamination resistance and crack resistance improved. When thermal cycling or the like is applied to the ceramics heat shield layers 3, a thermal stress resulting from the application is concentrated to the neighborhood of its interface with the metal bonded layer 2 or the metal base material 1. By forming the first ceramics layer 3a having a high strength based on the high elastic modulus and high hardness, it is possible to suppress the occurrence of cracks or fractures due to a thermal stress. Therefore, the ceramics heat shield layers 3 can be prevented from being delaminated due to cracks or fractures in the neighborhood of the interface.

But, when the ceramics heat shield layers 3 is totally formed of the first ceramics layer 3a having a high elastic modulus and high hardness, a stress $\sigma_1$ produced in the ceramics layer due to the application of thermal cycling or the like increases, and cracks or the like are readily caused suddenly due to the propagation of cracks due to a thermal shock, a thermal stress, or the like.

The stress σ produced in the ceramics layer is expressed as $\sigma=E\cdot\Delta\alpha\cdot\Delta T/(1-v^2)$. In this expression, E denotes an elastic modulus, $\Delta\alpha$ difference of thermal expansion coefficient, $\Delta T$ a temperature difference, and $v$ a Poisson's ratio. When the condition is kept constant, $\Delta\alpha$, $\Delta T$ and $v$ become a constant, so that the produced stress σ becomes great as the elastic modulus E of the ceramics layer becomes great. Therefore, when the ceramics heat shield layers 3 is totally made of the first ceramics layer 3a, its thermal shock resistance or the like is lowered greatly.

On the other hand, the second ceramics layer 3b has a low elastic modulus and low hardness, and a stress $\sigma_2$ produced within it is small. When the second ceramics layer 3b having a same film thickness is formed on the first ceramics layer 3a, an elastic modulus $E_m$ is mostly expressed as $E_m=(E_1+E_2)/2$. In other words, the elastic modulus $E_m$ of the ceramics heat shield layers 3 as the whole changes to $E_2<E_m<E_1$ according to each film thickness of ceramics layers.

By lowering the elastic modulus $E_m$ of the ceramics heat shield layers 3 as the whole by forming the second ceramics layer 3b having a low elastic modulus, the produced stress am of the ceramics heat shield layers 3 as the whole can be lowered. The produced stress $\sigma_m$ of the ceramics heat shield layers 3 as the whole is expressed as $\sigma_2<\sigma_m<\sigma_1$. Therefore, by forming the second ceramics layer 3b having a low elastic modulus and low hardness on the first ceramics layer 3a having a high elastic modulus and high hardness, fractures or the like can be prevented from formed by the abrupt propagation of cracks due to a thermal shock or a thermal stress.

The first ceramics layer 3a has a different thickness depending on its elastic modulus, hardness, density (porosity) or environment at which member is used, a gas turbine blade, for example, desirably has a thickness of about 0.1 to 200 μm. When the first ceramics layer 3a has a thickness of less than 0.1 μm, it may not be tightly adhered to the metal bonded layer 2 or the metal base material 1. In addition, the oxidation inhibiting effect of the metal bonded layer 2 or the metal base material 1 is lowered. On the other hand, when the first ceramics layer 3a has a thickness of more than 200 μm, the produced stress of the ceramics heat shield layers 3 as the whole becomes great, so that fractures or the like may be produced readily and a thermal shielding property may be lowered. The first ceramics layer 3a is preferably set to have a thin thickness as its elastic modulus and hardness are higher.

It is also desired to set the area of forming the first ceramics layer 3a and its strength according to a temperature at which the heat resisting member 4 is used. For example, when the heat resisting member is used at 1073 K or lower, a thermal stress produced is small, so that cracks and fractures are caused inside the ceramics heat shield layers 3 to a range of about 0.1 to 200 μm just above the metal bonded layer 3 or the metal base material 1. Therefore, by providing the first ceramics layer 3a having a high strength to cover the above range, the crack resistance and peel resistance of the ceramics heat shield layers 3 can be improved.

When a working environment temperature is 1273 K or higher or a stress is great, delamination of the ceramics heat shield layers 3 occurs at a portion closer to its interface with the metal bonded layer 2 or the metal base material 1. Specifically, delamination occurs in a range of about 0.1 to 50 μm just above the metal bonded layer 2 or the metal base material 1. In such a case, it is desired to provide a higher strength to the pertinent portion where such a great stress is applied. In other words, it is desirable to form a ceramics layer having a greater elastic modulus and hardness.

The thickness of the second ceramics layer 3b may be determined in view of a predicted fracture stress and a required heat shielding property, desirably in a range of about 50 to 3000 μm. When the second ceramics layer 3b has a thickness of less than 50 μm, the ceramics heat shield layers 3 as the whole may have a lowered thermal shock resisting effect or a heat shielding property. On the other hand, when its thickness exceeds 3000 μm, heat resistance cycling may be lowered.

The first ceramics layer 3a has the above-described high elastic modulus and high hardness. The elastic modulus $E_1$ of the first ceramics layer 3a is sufficient as long as it is higher than the elastic modulus $E_2$ of the second ceramics layer 3b, and it is specifically desired to be 45 GPa or more. When the elastic modulus of the first ceramics layer 3a is less than 45 GPa, fractures or delamination in the neighborhood of the interface with the metal bonded layer 2 or the metal base material 1 of the ceramics heat shield layers 3 may not be prevented fully. The elastic modulus $E_1$ of the first ceramics layer 3a is desired to be 50 GPa or more so that a fracture resisting property and a delamination resistance can be enhanced further.

On the other hand, the elastic modulus $E_2$ of the second ceramics layer 3b is desired to be less than 45 GPa. When the elastic modulus $E_2$ of the second ceramics layer 3b exceeds 45 GPa, the produced stress in the ceramics heat shield layer 3b as the whole may not be decreased sufficiently. And, the elastic modulus $E_2$ of the second ceramics layer 3b is desired to be 40 GPa or below so that the produced stress can be further lowered. But, when the elastic modulus $E_2$ of the second ceramics layer 3b is excessively low, its essential strength is deteriorated, so that it is desired to be 20 GPa or more.

The elastic modulus E of the ceramics layer in this invention indicates a value determined when each ceramics layer is solely formed. The elastic modulus E ($=\sigma/e$) is determined by adding the stress a to the ceramics layer produced solely and measuring an elastic strain e at the time.

And, hardness $H_1$ of the first ceramics layer 3a is basically sufficient when it is higher than hardness $H_2$ of the second ceramics layer 3b, and preferably 650 Hv or more. Hardness $H_2$ of the second ceramic layer 3b is desired to be less than 650 Hv. Hardness $H_1$, $H_2$ of these first and second ceramics layers 3a, 3b are specified based on the same reasons as those of the above-described elastic modulus $E_1$, $E_2$. Hardness H of the ceramics layer (cross section or surface) referred to in the present invention indicates Vickers hardness (Hv) obtained when a load of 200 gf is held for 30 seconds.

To obtain the first ceramics layer 3a having a high elastic modulus as described above, a material having a high elastic modulus as a material property may be used. As a component for the first ceramics layer 3a, except stabilized zirconia, alumina, alumina-titania mixed oxide, magnesia and spinel of which a sintered body has a relatively higher elastic modulus are used preferably. At that time, stabilized zirconia of which a sintered body has a lower elastic modulus than the above-described ceramics materials and which has a better heat shielding property is preferably used for the second ceramics layer 3b having a low elastic modulus.

Among the above-described ceramics materials having a high elastic modulus, magnesia has a high thermal expansion coefficient as the ceramics material and higher than that of zirconia, so that a difference of thermal expansion coefficient ($\Delta\alpha$) with respect to the metal bonded layer 2 or the metal base material 1 can be lowered. When such a substance layer is formed directly on the metal bonded layer 2 or the metal base material 1, a thermal stress proportional to the thermal expansion coefficient $\Delta\alpha$ which is a cause of delaminating the ceramics heat shield layers 3 can be lowered advantageously.

But, the above-described ceramics materials has an inferior heat shielding property as compared with zirconia and is preferably used as a part of the ceramics heat shield layers 3. For example, when the first ceramics layer 3a is formed of alumina, alumina-titania mixed oxide, magnesia or spinel, the second ceramics layer 3b is desired to be formed of stabilized zirconia having a superior heat shielding property. And, it may be formed as a part of the first ceramics layer 3a.

As described above, an elastic modulus is closely related with hardness, so that a high hardness ceramics layer is suitable for the first ceramics layer 3a. Besides, the elastic modulus and hardness of the ceramics layer are heavily affected by its density and surface roughness. Therefore, the first ceramics layer 3a having a high elastic modulus and high hardness can also be obtained by enhancing a relative density of the ceramics layer. For the second ceramics layer 3b, a low elastic modulus and low hardness can be obtained by setting a relative density low.

Specifically, the first ceramics layer 3b can be achieved by a ceramics layer having a high density, and the second ceramics layer 3b can be achieved by a ceramics layer having a low density. In such a case, a relative density $D_1$ of the first ceramics layer 3a and a relative density $D_2$ of the second ceramics layer 3b are at least required to satisfy $D_1 > D_2$. Specifically, it is desired that the relative density $D_1$ of the first ceramics layer 3a is 88% or more, and the relative density $D_2$ of the second ceramics layer 3b is less than 88%.

When the relative density $D_1$ of the first ceramics layer 3a is less than 88%, a high elastic modulus and high hardness may not be attained, oxidation of the metal bonded layer 2 or the metal base material 1 is accelerated, and delamination from the neighborhood of the interface with the ceramics heat shield layers 3 may be caused easily.

In other words, by forming the first ceramics layer 3a having a high relative density $D_1$ of 88% or more directly on the metal bonded layer 2 or the metal base material 1, the metal bonded layer 2 or the metal base material 1 can be prevented from being oxidized. Therefore, it is possible to more effectively prevent the ceramics heat shield layers 3 from being delaminated from the neighborhood of the interface due to a stress caused as the metal bonded layer 2 is oxidized. The relative density $D_1$ of the first ceramics layer 3a is preferably 90% or more in view of an elastic modulus, hardness, and prevention of oxidation of the metal bonded layer 2 or the metal base material 1.

On the other hand, when the relative density $D_2$ of the second ceramics layer 3b exceeds 88%, a low elastic modulus and low hardness may not be obtained, and a heat shielding property is deteriorated, possibly resulting in impairing the original properties of the ceramics heat shield layers 3.

In other words, by forming the second ceramics layer 3b having a low relative density $D_2$ of less than 88% on the first ceramics layer 3a, a sufficient heat shielding effect can be obtained. Besides, a film thickness required for heat shielding can be satisfied by the second ceramics layer 3b. The relative density $D_2$ of the second ceramics layer 3b is desired to be 85% or below in view of a thermal shielding property and the like. But, when the relative density $D_2$ of the second ceramics layer 3b is excessively low, its essential strength as the ceramics layer is deteriorated, so that it is preferable to have the relative density $D_2$ of 75% or more.

The first ceramics layer 3a having a relative density $D_1$ of 88% or more can be formed readily by a PVD method, a CVD method, or a spin coating method for example. Especially, among the PVD methods, it is desirable to adopt an EB-PVD method using electron beams.

When stabilized zirconia is used to form the first ceramics layer 3a having a high density by the above-described method, it is desirable to form the ceramics layer which is oriented in the direction of either an axis a or c or both directions with respect to the metal bonded layer 2 or the metal base material 1. The high density zirconia layer having such orientation has good adhesion to the metal bonded layer 2 or the metal base material 1. Therefore, delamination at the interface of the ceramics heat shield layers 3 and the metal bonded layer 2 or the metal base material 1 is prevented, and it is effective to improve the thermal fatigue resistance of the ceramics heat shield layers 3.

The term "orientation" means that when a diffracted intensity I (h, k, 1) of stabilized zirconia is measured by X-ray diffractometry, either $I_{t,c}(200)$ or $I_t(002)$ (subscripts t,c mean tetragonal phase and cubic phase, respectively) or a sum of them exceeds 1.0 time with respect to the greatest diffracted intensity excepting (200), (002) or their higher-order diffracted surfaces.

The first ceramics layer 3a having a relative density $D_1$ of 88% or more can also be formed by a spray coating method. Powder to be used as a material for thermal spraying is preferably fine powder having a particle diameter in a range of, for example, 0.1 to 88 μm. The particle diameter of the material powder for the thermal spraying is more preferably in a range of 1 to 60 μm, and most preferably in a range of 10 to 40 μm. By a high-density thermal spraying method using such fine powder, the first ceramics layer 3a can be formed relatively easily.

Especially, the fine material powder for the thermal spraying is preferably fused and crushed powder than agglomerated powder or agglomerated sintered powder. The fused and crushed powder provides the ceramics layer with a high elastic modulus, high hardness and high density. Besides, the thermal spraying method for forming the first ceramics layer 3a having a high density is preferably thermal spraying in a vacuum atmosphere HVOF method rather than thermal spraying in the atmosphere.

The second ceramics layer 3b having a relative density $D_2$ of less than 88% can be formed easily by the thermal spraying. As the thermal spraying to be adopted, a plasma spray coating method is most effective in view of practical use. And, powder used as the material for thermal spraying is preferably agglomerated powder having a particle diameter in a range of 10 to 150 μm for example. The powder for the thermal spraying is preferably has a particle diameter in a range of 44 to 125 μm, and more preferably in a range of 60 to 125 μm. Specially, the agglomerated material powder for the thermal spraying is preferably agglomerated powder or agglomerated sintered powder than the fused and crushed powder. The agglomerated powder or agglomerated sintered powder provides the ceramics layer with a low elastic modulus, low hardness and low density.

When the ceramics layers 3a, 3b have their surface with small roughness, an elastic modulus and hardness can be made higher. Therefore, it is desired that the surface roughness of the first ceramics layer 3a is made small. Conversely, the surface roughness of the second ceramics layer 3b is desired to be made large. At the time, the surface roughness $R_1$ of the first ceramics layer 3a and the surface roughness $R_2$ of the second ceramics layer 3b are desired to satisfy at least $R_1 < R_2$.

Especially, the surface roughness of the second ceramics layer 3b is desired that ten-point average roughness $R_z$ is expressed as $R_z \geq 55$ μm, a maximum height $R_{max}$ as $R_{max} \geq 80$ μm, and center line average roughness $R_a$ as $R_a \geq 7.5$ μm. It is sufficient when at least one of such roughness is satisfied, but it is desired that all of them are satisfied. A ceramics layer having such surface roughness does not easily suffer from cracks by thermal cycling. Besides, since the propagation of cracks can be detoured, it is possible to further improve a thermal fatigue resistance. Surface roughness of the second ceramics layer 3b is further desired to be $R_2 > 58$ μm, $R_{max} > 90$ μm, $R_a > 8.0$ μm.

As described above, by configuring the ceramics layers 3 by the first ceramics layer 3a having a high elastic modulus, high hardness and high density which is directly formed on the metal bonded layer 2 or the metal base material 1 and the second ceramics layer 3b having a low elastic modulus, low hardness and low density which is formed on the first ceramics layer 3a, it is possible to stably prevent the occurrence of delamination by fractures due to thermal fatigue and also the occurrence of fractures due to a thermal shock or the like. Accordingly, the heat resisting material 4 in this embodiment can be used stably for a long time of period in a high-temperature atmosphere and in the working environment where thermal cycling and thermal shock are applied. This heat resisting member 4 is suitable as a component material for high-temperature devices such as gas turbines and engines.

When the heat resisting member 4 having the ceramics heat shield layers 3, particularly the zirconia layer, is used in a high-temperature oxidizing atmosphere for a long period of time, it is hard to completely prevent the metal bonded layer beneath it from being oxidized. And, when an oxidized layer is formed, close adhesion of the ceramics heat shield layers 3 is degraded, and delamination may occur (delamination inside the oxidized layer).

In order to control the growth rate of the oxidized layer to be formed on the metal bonded layer 2 in the high-temperature oxidizing atmosphere, it is desirable to produce the first ceramics layer 3a in a low oxygen concentration atmosphere, or to heat-treat the produced first ceramics layer 3a in a low oxygen concentration atmosphere. Such film-forming and heat-treating can form a dense alumina layer between the first ceramics layer 3a and the metal bonded layer 2. The heat-treatment is effective for the ceramics layer having a high relative density, and particularly effective for the first ceramics layer 3a having a relative density of 88% or more and small open voids.

Figure 3:
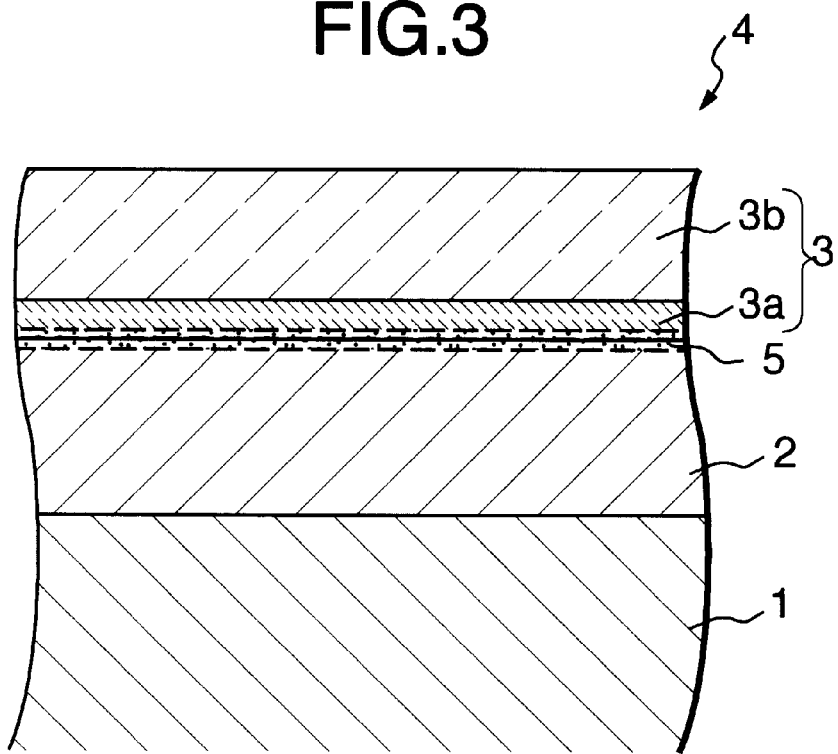
FIG. 3 is a sectional view showing a configuration of another example of the heat resisting member shown in FIG. 1.

By the above heat treatment, the dense alumina layer 5 is formed in advance between the metal bonded layer 2 and the first ceramics layer 3a as shown in FIG. 3. This dense alumina layer 5 prevents oxygen from dispersing from the first ceramics layer 3a to the metal bonded layer 2. In a case of directly forming the ceramics heat shield layers 3 on the metal base material 1, the same heat treatment is effective.

By the heat treatment in a low oxygen concentration atmosphere, an amount of oxygen short in the first ceramics layer 3a, particularly the zirconia layer, increases, so that oxygen to be consumed for the oxidation of the metal bonded layer 2 is lowered. Thus, the growth rate of the oxidized layer can be controlled.

And, the alumina layer 5 which is previously heat-treated in the low oxygen concentration atmosphere has a slow growth rate, so that it is very dense. Since this high-density alumina layer 5 prevents oxygen from dispersing, the growth rate of the oxidized layer can be further controlled. Thus, it is possible to prevent the first ceramics layer 3a from peeling due to cracks within the oxidized layer on the metal bonded layer 2.

As a specific heat-treating condition, the atmosphere oxygen concentration is preferably 0.2 atmospheric pressure or below in oxygen partial pressure. And, the treating temperature is preferably about 773 to 1473 K. The atmosphere oxygen concentration is desired to be low as much as possible, and particularly the treatment is desired to be made in a vacuum. Since the shortage of oxygen for the first ceramics layer 3a can be obtained in a short time when the heat treating temperature is higher, it is desired to determine the heat treating temperature taking the high-temperature resistances of the metal base material 1 and the metal bonded layer 2 into account. On the other hand, since the alumina layer 5 cannot be formed satisfactorily at a low temperature and the effect of preventing the growth of the oxidized layer is insufficient, the heat treating temperature is preferably 773 K or higher.

The heat treatment is basically performed after forming the first ceramics layer 3a, but it may be performed after forming the second ceramics layer 3b. And, almost the same effect can be obtained when the first ceramics layer 3a is formed in a low oxygen concentration atmosphere.

Figure 4:
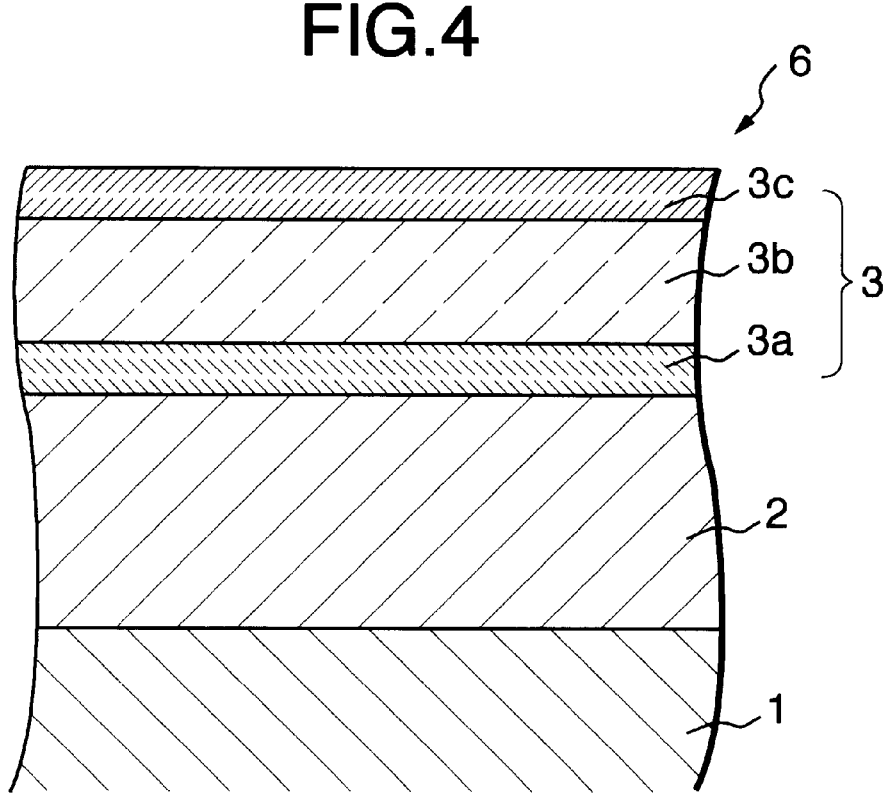
FIG. 4 is sectional view showing a configuration of the heat resisting member according to another embodiment of the present invention.

Now, the heat resisting material according to another embodiment of the invention will be described with reference to FIG. 4. A heat resisting member 6 shown in FIG. 4 has also a third ceramics layer 3c, which has the same high elastic modulus, high hardness and high density as the first ceramics layer 3a, formed on the second ceramics layer 3b in the above-described embodiment. The ceramics heat shield layers 3 comprise the three ceramics layers 3a, 3b and 3c. Other structure is the same as in the above-described embodiment.

As to the conditions of the third ceramics layer 3c, an elastic modulus $E_3$ satisfies $E_3<E_2$. Hardness $H_3$ satisfies $H_3<H_2$. A relative density $D_3$ satisfies $D_3<D_2$. Their specific conditions are preferably determined to be the same as those for the above-described first ceramics layer 3a.

In the working environment where gas turbines or aircraft engines having the heat resisting member according to the present invention are used, there is a problem that fine dust and coarse particles strike to damage the ceramics heat shield layers 3. To prevent the problem, the third ceramics layer 3c having a high elastic modulus, high hardness and high density is formed on the outermost surface of the ceramics heat shield layers 3. Thus, the ceramics heat shield layers 3 can be prevented from being damaged or abraded by such flying substances.

When the ceramics heat shield layers 3 are fully made of high-density ceramics layers, surface damages will sharply propagate cracks and fractures into the interior to accelerate local oxidation, possibly resulting in delamination of the ceramics heat shield layers 3. On the other hand, in the ceramics heat shield layers 3 which sequentially comprise the first ceramics layer 3a having the high elastic modulus, high hardness and high density, the second ceramics layer 3b having the low elastic modulus, low hardness and low density, and the third ceramics layer 3c having the high elastic modulus, high hardness and high density, the sharp propagation of cracks or a thermal stress is relieved by the second ceramics layer 3b, so that the ceramics heat shield layers 3 can be effectively prevented from being delaminated.

The third ceramics layer 3c can be formed by the PVD method, the CVD method, the spin coating method, or the high-density thermal spraying method using fine-grain powder in the same way as the first ceramics layer 3a. Among the thermal spray methods, a low-vacuum thermal spray method, an HVOF method and a JP (jet plasma) method are preferably used except atmospheric plasma spray method.

In addition to such thermal spraying methods, after an atmosphere thermal spraying or the above-described thermal spraying, a method may be used to perform a laser treatment to modify the surface only to a ceramics layer having high hardness. By such a modifying method, a ceramics layer having much higher hardness can be obtained.

The above third ceramics layer 3c preferably has a thickness of 100 μm or below though variable depending on the thickness of the first ceramics layer 3a. Especially, when the first ceramics layer 3a is particularly thick, the third ceramics layer 3c is desired to be thin in order to prevent the increase of a thermal stress effecting on the third ceramics layer 3c. Conversely, to enhance the effect of controlling the damage due to the flying substances, it is preferable to decrease the thickness of the first ceramics layer 3a.

A total of the thicknesses of the first ceramics layer 3a and the third ceramics layer 3c is desired not to exceed 300 μm though variable depending on their elastic modulus and hardness. Furthermore, it is desirable that a total of the thicknesses of the first and third ceramics layers 3a, 3c is about 200 μm.

The above-described respective embodiments have been described with the ceramics heat shield layers formed of a two-layered structure or three-layered structure. But, the ceramics heat shield layers can also be formed of four or more ceramics layers. For example, the first ceramics layer and the second ceramics layer each can be formed of a plurality of layers, respectively. The third ceramics layer can also be formed in the same way.

Now, description will be made of specific examples and evaluated results of the above-described embodiments.

EXAMPLE 1

An Ni-based super alloy was used as the metal base material. On the Ni-based super alloy base material heated up to 1273 K, a stabilized zirconia layer (8 wt % $Y_2O_3$—$ZrO_2$) was formed to a thickness of 30 μm by a spin coating method. The stabilized zirconia layer formed by the spin coating method is a first ceramics layer.

The first stabilized zirconia layer had a relative density of 90%. And, a stabilized zirconia layer produced under the same condition was measured for its elastic modulus and Vickers hardness as follows. The elastic modulus was measured by a strain gauge and an instron type testing machine, using a 50 mm×40 mm×0.3 m size of test piece prepared by coating a zirconia layer having 300 μm of thickness onto a stainless board having roughness of $R_a$<2.0 μm. The Vickers hardness (Hv) was measured in the cross section of the coating by holding a load of 200 gf for 30 seconds. It was found that the elastic modulus was 50 GPa, and the Vickers hardness was 700 Hv.

Then, on the first stabilized zirconia layer, another stabilized zirconia layer having the same composition was formed to a thickness of 100 μm or below by a plasma spray coating. This stabilized zirconia layer formed by the plasma spray coating was measured for its surface roughness, and still another stabilized zirconia layer having the same composition was formed on it by the plasma spray coating so that a total thickness became 300 μm. Thus, the stabilized zirconia layer finally formed by the plasma spray coating is a second ceramics layer.

The second stabilized zirconia layer formed by the plasma spray coating had a relative density of 85%. And, a single-layered stabilized zirconia layer was formed by the plasma spray coating under the same condition. Its elastic modulus and Vickers hardness were measured by the same method as described above. It was found that the elastic modulus was 38 GPa, and the Vickers hardness was 480 Hv.

Thus, the heat resisting member having a two-layered stabilized zirconia heat shield layer was produced. The outermost surface of the second stabilized zirconia layer had surface roughness $R_Z \geq 55$ μm, $R_{max} \geq 80$ μm, and $R_a \geq 7.5$ μm.

Comparative Examples 1, 2

Under the same condition as in Example 1, a stabilized zirconia layer having the same thickness as in Example 1 was formed on an Ni-based super alloy base material by a spin coating method only (Comparative Example 1). Similarly, a stabilized zirconia layer having the same thickness was formed by the plasma spray coating only (Comparative Example 2). These stabilized zirconia layers according to the Comparative Examples 1, 2 have the same relative density, elastic modulus and Vickers hardness as in Example 1.

Test samples taken from the heat resisting members of Example 1 and Comparative Examples 1, 2 were subjected to a thermal fatigue test with one cycle consisting of one hour at 1373 K and one hour at 298 K. And, the number of heat cycles until the stabilized zirconia heat shield layer was delaminated was measured. As a result, the heat resisting member produced by Example 1 withstood the thermal cycles exceeding the number of 1000 times. No delamination was observed. On the other hand, the test samples taken from Comparative Examples 1, 2 had cracks by the thermal cycles of dozens of times. And, the sample taken from Comparative Example 1 had delamination by 150 cycles, and the sample from Comparative Example 2 had delamination by 100 cycles.

In the heat resisting member according to Example 1, when the second stabilized zirconia layer had the surface roughness $R_z$<55 μm, $R_{max}$<80 μm, and $R_a$<7.5 μm, the number of thermal cycles that the heat resisting member could withstand was lowered.

EXAMPLE 2

An Ni—Co—Cr—Al—Y layer having a thickness of 150 μm was formed on an Ni-based super alloy base material by a plasma spray coating. On this metal bonded layer, a first stabilized zirconia layer having a thickness of 1 μm was formed by an EB-PVD method. The stabilized zirconia was composed of 4 to 20 wt% of $Y_2O_3$—$ZrO_2$. A plurality of members were produced with the $Y_2O_3$ concentration varied within the above range. Such first stabilized zirconia layers had a relative density of 90% or more. And, in the same way as in Example 1, the respective stabilized zirconia layers formed by the EB-PVD method were measured for their elastic modulus and Vickers hardness. It was found that the elastic modulus was 48 to 55 GPa, and the Vickers hardness was 650 to 700 Hv.

Then, the respective stabilized zirconia layers were heat-treated at 1273 K for 20 hours in a low oxygen concentration atmosphere with 0.2 atmospheric pressure in oxygen partial pressure. At this stage, it was checked by SEM observation that a dense alumina layer was formed between the Ni—Co—Cr—Al—Y layer and the first stabilized zirconia layer. And, it was also checked that the first stabilized zirconia layer was oriented in an axis a or axis c.

Then, as the second ceramics layer, the stabilized zirconia layer with the same composition was formed to a thickness of 200 μm on the respective first stabilized zirconia layers by the plasma spray coating. Thus, a plurality of heat resisting members having the stabilized zirconia heat shield layer were produced. The second stabilized zirconia layers formed by the plasma spray coating had a relative density of 82%. And, in the same way as in Example 1, the respective stabilized zirconia layers formed by the plasma spray coating were measured for their elastic modulus and Vickers hardness. It was found that the elastic modulus was 28 to 40 GPa, and the Vickers hardness was 400 to 580 Hv.

Test samples taken from the respective heat resisting members produced as described above were held in the atmosphere at 1273 K for 10000 hours, then subjected to a thermal fatigue test with one cycle consisting of one hour at 1223 K and one hour at 298 K. And, the number of thermal cycles until the stabilized zirconia heat shield layer was delaminated was measured. After testing, the condition in the neighborhood of the interface between the Ni—Co—r—Al—Y layer and the first stabilized zirconia layer was examined by SEM observation.

It was found that the Ni—Co—Cr—Al—Y layer was prevented from being oxidized exceeding the original level regardless of the $Y_2O_3$ composition. And, delamination was not observed even after the thermal cycles exceeding 1000 times. Among the heat resisting members according to Example 2, the number of thermal cycles that they could withstand was lowered when the first stabilized zirconia layer had orientation of (111) or (311).

EXAMPLE 3

An Ni—Co—Cr—Al—Y layer having a thickness of 150 μm was formed on an Ni-based super alloy base material by an atmosphere spray coating. On this metal bonded layer, a first stabilized zirconia layer having a thickness of 150 μm was formed by the atmospheric plasma spray coating method using fused and crushed powder (particle diameter range: 10 to 40 am) consisting of 8 wt % of $Y_2O_3$—$ZrO_2$ as a material for spray coating. This first stabilized zirconia layer had a relative density of 89%. In the same way as in Example 1, the stabilized zirconia layer formed by the atmospheric plasma spray coating using the fused and crushed powder was measured for its elastic modulus and Vickers hardness. It was found that the elastic modulus was 60 GPa, and the Vickers hardness was 700 Hv.

Then, on the first stabilized zirconia layer, a second stabilized zirconia layer was formed to a thickness of 100 μm by the atmospheric plasma spray coating method using agglomerated sintered powder (particle diameter range: 10 to 88 μm) having the same composition as the first stabilized zirconia layer was formed. The second stabilized zirconia layer had a relative density of 80%. In the same way as in Example 1, the stabilized zirconia layer formed by the atmospheric plasma spray coating method using the agglomerated sintered powder was measured for its elastic modulus and Vickers hardness. It was found that the elastic modulus was 35 GPa, and the Vickers hardness was 550 Hv. The second stabilized zirconia layer had the surface roughness $R_z \geq 58$ μm, $R_{max} \geq 88$ μm, and $R_a \geq 8.3$ μm.

Comparative Example 3

On an Ni-based super alloy base material which had an Ni—Co—Cr—Al—Y layer having a thickness of 150 μm formed thereon, a stabilized zirconia layer having a thickness of 150 μm was formed by an atmospheric plasma spray coating method using agglomerated sintered powder (particle diameter range: 10 to 88 μm) consisting of 8 wt % of $Y_2O_3$—$ZrO_2$ as a material for spray coating. This stabilized zirconia layer had a relative density of 88%. And, in the same way as in Example 1, the stabilized zirconia layer formed by the atmospheric plasma spray coating method using the agglomerated sintered power was measured for its elastic modulus and Vickers hardness. It was found that the elastic modulus was 32 GPa, and the Vickers hardness was 480 Hv.

Then, on the above stabilized zirconia layer, a stabilized zirconia layer was formed to a thickness of 100 μm by the atmospheric plasma spray coating using as a material for spray coating fused and crushed powder (particle diameter range: 10 to 40 μm) having the same composition as the former stabilized zirconia layer. This stabilized zirconia layer had a relative density of 90%. And, in the same way as in Example 1, the stabilized zirconia layer formed by the atmospheric plasma spray coating method using the fused and crushed power was measured for its elastic modulus and Vickers hardness. It was found that the elastic modulus was 55 GPa, and the Vickers hardness was 700 Hv. The stabilized zirconia layer formed by the atmospheric plasma spray coating method using the fused and crushed powder had the surface roughness $R_z < 50$ μm, $R_{max} \leq 70$ μm, and $R_a < 6.8$ μm.

Comparative Example 4

On an Ni-based super alloy base material which had an NiCo—Cr—Al—Y layer having a thickness of 150 μm formed thereon, a stabilized zirconia layer having a thickness of 250 μm alone was formed by an atmospheric plasma spray coating method using agglomerated sintered powder (particle diameter range: 10 to 88 μm) consisting of 8 wt % of $Y_2O_3$—$ZrO_2$ as a material for spray coating. This stabilized zirconia layer had a relative density of 79%. And, in the same way as in Example 1, the stabilized zirconia layer formed by the atmospheric plasma spray coating method using the agglomerated sintered power was measured for its elastic modulus and Vickers hardness. It was found that the elastic modulus was 42 GPa, and the Vickers hardness was 470 Hv. This stabilized zirconia layer had the surface roughness $R_z \geq 61$ μm, $R_{max} \geq 90$ μm, and $R_a \geq 7.3$ μm.

Comparative Example 5

On an Ni-based super alloy base material which had an NiCo—Cr—Al—Y layer having a thickness of 150 μm formed thereon, a stabilized zirconia layer having a thickness of 250 μm alone was formed by an atmospheric plasma spray coating method using fused and crushed powder (particle diameter range: 10 to 40 μm) consisting of 8 wt% of $Y_2O_3$—$ZrO_2$ as a material for spray coating. This stabilized zirconia layer had a relative density of 92%. And, in the same way as in Example 1, the stabilized zirconia layer formed by the atmospheric plasma spray coating method using the fused and crushed power was measured for its elastic modulus and Vickers hardness. It was found that the elastic modulus was 70 GPa, and the Vickers hardness was 750 Hv. This stabilized zirconia layer had the surface roughness $R_z < 53$ μm, $R_{max} \leq 60$ μm, and $R_a \leq 6.2$ μm.

Test samples taken from the respective heat resisting members produced by Example 3 and Comparative Examples 3, 4 and 5 were subjected to a thermal fatigue test with one cycle consisting of one hour at 1273 K and one hour at 298 K. And, the number of thermal cycles until the stabilized zirconia heat shield layer was delaminated was measured. As a result, the heat resisting member according to Example 3 withstood the thermal cycles exceeding 7000 times, and no delamination was observed. On the other hand, delamination occurred when the sample taken from Comparative Example 3 was tested for 400 cycles, the sample from Comparative Example 4 tested for 5000 cycles, and the sample from Comparative Example 5 tested for 20 cycles.

EXAMPLE 4

An Ni—Co—Cr—Al—Y layer having a thickness of 150 μm was formed on an Ni-based super alloy base material by an atmospheric plasma spray coating. On this metal bonded layer, a magnesia layer having a thickness of 50 μm was formed as a first ceramics layer by an atmospheric plasma spray coating method using fused and crushed MgO powder (particle diameter range: 10 to 40 μm). This magnesia layer had a relative density of 92%. In the same way as in Example 1, the magnesia layer was measured for its elastic modulus and Vickers hardness. It was found that the elastic modulus was 72 GPa, and the Vickers hardness was 730 Hv.

Then, on the magnesia layer, a stabilized zirconia layer was formed to a thickness of 100 μm by the atmospheric plasma spray coating method using fused and crushed powder (particle diameter range: 10 to 40 μm) consisting of 8 wt % of $Y_2O_3$—$ZrO_2$. Then, a stabilized zirconia layer was formed to a thickness of 100 μm by the atmospheric plasma spray coating method using agglomerated sintered powder (particle diameter range: 10 to 88 μm) having the same composition as above.

The respective layers of the above-described stabilized zirconia layer obtained from fused and crushed powder and the stabilized zirconia layer obtained from agglomerated sintered powder had a relative density of 91% and 82%, respectively. And, in the same way as in Example 1, the respective layers of the above two-layered stabilized zirconia layer were measured for their elastic moduli and Vickers hardness. It was found that the their elastic moduli were 46 GPa, 39 GPa, and Vickers hardness were 690 Hv, 540 Hv, respectively. The outermost surface of the stabilized zirconia layer had surface roughness $R_z \geq 63$ $\mu m$ $R_{max} \geq 95$ $\mu m$, and $R_a \geq 8.3$ $\mu m$.

EXAMPLE 5

An Ni—Co—Cr—Al—Y layer having a thickness of 150 $\mu m$ was formed on an Ni-based super alloy base material by an atmospheric plasma spray coating. On this metal bonded layer, a magnesia layer having a thickness of 100 $\mu m$ was formed as a first ceramics layer by an atmospheric plasma spray coating method using fused and crushed MgO powder (particle diameter range: 10 to 40 $\mu m$). This magnesia layer had a relative density of 85%. In the same way as in Example 1, the magnesia layer was measured for its elastic modulus and Vickers hardness. It was found that the elastic modulus was 75 GPa, and the Vickers hardness was 740 Hv.

Then, on the magnesia layer, a stabilized zirconia layer was formed to a thickness of 150 $\mu m$ by the atmospheric plasma spray coating method using agglomerated powder (particle diameter range: 10 to 88 $\mu m$) consisting of 8 wt % of $Y_2O_3$—$ZrO_2$. This stabilized zirconia layer had a relative density of 79%. In the same way as in Example 1, the stabilized zirconia layer was measured for its elastic modulus and Vickers hardness. It was found that the elastic modulus was 28 GPa, and the Vickers hardness was 450 Hv. The stabilized zirconia layer had surface roughness $R_z \geq 62$ $\mu m$, $R_{max} \geq 93$ $\mu m$, and $R_a \geq 8.0$ $\mu m$.

EXAMPLE 6

An Ni—Co—Cr—Al—Y layer having a thickness of 150 $\mu m$ was formed on an Ni-based super alloy base material by an atmospheric plasma spray coating. On this metal bonded layer, an $Al_2O_3$—$TiO_2$ layer having a thickness of 100 $\mu m$ was formed as a first ceramics layer by an atmospheric plasma spray coating method using fused and crushed powder (particle diameter range: 10 to 40 $\mu m$) of $Al_2O_3$—10% $TiO_2$. This $Al_2O_3$—$TiO_2$ layer had a relative density of 82%. In the same way as in Example 1, the $Al_2O_3$—$TiO_2$ layer was measured for its elastic modulus and Vickers hardness. It was found that the elastic modulus was 60 GPa, and the Vickers hardness was 680 Hv.

Then, on the $Al_2O_3$—$TiO_2$ layer, a stabilized zirconia layer was formed to a thickness of 50 $\mu m$ by the atmospheric plasma spray coating method using fused and crushed powder (particle diameter range: 10 to 40 $\mu m$) consisting of 8 wt % of $Y_2O_3$—$ZrO_2$. In addition, another stabilized zirconia layer was formed to a thickness of 100 $\mu m$ by the atmospheric plasma spray coating method using agglomerated sintered powder (particle diameter range: 10 to 88 $\mu m$) having the same composition as above.

The respective layers of the above two-layered stabilized zirconia layer had a relative density of 91% and 86%, respectively. And, in the same way as in Example 1, the respective layers of the above two-layered stabilized zirconia layer were measured for their elastic moduli and Vickers hardness. It was found that their elastic moduli were 43 GPa, 35 GPa, and Vickers hardness were 680 Hv, 500 Hv, respectively. The outmost surface of the stabilized zirconia layer had surface roughness $R_z \geq 60$ $\mu m$, $R_{max} \geq 85$ $\mu m$, and $R_a \geq 7.9$ m.

Test samples taken from the respective heat resisting members produced by Examples 4, 5, and 6 were subjected to a thermal fatigue test with one cycle consisting of one hour at 1273 K and one hour at 298 K. And, the number of thermal cycles until the ceramics heat shield layer was delaminated was measured. As a result, the heat resisting members according to Examples 4, 5 and 6 withstood the thermal cycles exceeding 7000 times, and no delamination was observed.

As Reference 1, a heat resisting member having the same structure as the one produced in Example 5 was produced by following the procedure of Example 5 excepting that the magnesia layer had a thickness of 210 $\mu m$. And, as Reference 2, a heat resisting member having the same structure as the one produced in Example 6 was produced by following the procedure of Example 6 excepting that the $Al_2O_3$—$TiO_2$ layer had a thickness of 220 $\mu m$.

The heat resisting members according to References 1, 2 were subjected to the thermal fatigue test in the same way. Delamination occurred when the sample from Reference 1 was tested for 300 cycles, and the sample from Reference 2 tested for 100 cycles. Thus, when the first ceramics layer having the high elastic modulus and high hardness is excessively thick, fractures may be formed within it readily, and a sufficient thermal fatigue property may not be obtained.

EXAMPLE 7

An Ni—Co—Cr—Al—Y layer having a thickness of 150 $\mu m$ was formed on an Ni-based super alloy base material by an atmospheric plasma spray coating. On this metal bonded layer, a first stabilized zirconia layer (8 wt % $Y_2O_3$—$ZrO_2$) having a thickness of 20 $\mu m$ was formed by an EB-PVD method with the base material heated to 773 to 1153 K. This first stabilized zirconia layer had a relative density of 93%. And, in the same way as in Example 1, the first stabilized zirconia layer formed by the EB-PVD method was measured for its elastic modulus and Vickers hardness. It was found that the elastic modulus was 55 GPa, and the Vickers hardness was 680 Hv.

Then, on the first stabilized zirconia layer, a stabilized zirconia layer having the same composition as the first stabilized zirconia layer was formed as a second stabilized zirconia layer to a thickness of 100 $\mu m$ by a plasma spray coating. The second stabilized zirconia layer formed by the plasma spray coating had a relative density of 85%. And, in the same way as in Example 1, the second stabilized zirconia layer formed by the plasma spray coating was measured for its elastic modulus and Vickers hardness. It was found that the elastic modulus was 40 GPa, and the Vickers hardness was 580 Hv.

After mirror polishing of the surface of the second stabilized zirconia layer, a stabilized zirconia layer having the same composition was formed as a third stabilized zirconia layer to a thickness of 100 $\mu m$ by the EB-PVD method. The third stabilized zirconia layer formed by the EB-PVD method had a relative density of 90%. And, in the same way as in Example 1, the third stabilized zirconia layer formed by the EB-PVD method was measured for its elastic modulus and Vickers hardness. It was found that the elastic modulus was 50 GPa, and the Vickers hardness was 670 Hv.

Comparative Example 6 and Reference 3

As Comparative Example 6, on an Ni-based super alloy base material having an Ni—Co—Cr—Al—Y layer formed to a thickness of 150 $\mu m$, a stabilized zirconia layer having a thickness of 100 $\mu m$ was formed by the atmospheric plasma spray coating. And, as Reference 3, on an Ni-based super alloy base material having an Ni—Co—Cr—Al—Y layer formed to a thickness of 150 $\mu m$, a stabilized zirconia layer having a thickness of 20 μm was formed by the EB-PVD method, then another stabilized zirconia layer having a thickness of 200 μm was formed by the atmospheric plasma spray coating.

Samples taken from the respective heat resisting members of Example 7, Comparative Example 6 and Reference 3 were subjected to the thermal fatigue test with one cycle consisting of one hour at 1373 K and one hour at 298 K under a condition that mixed powder of SiC, $SiO_2$ and $Al_2O_3$ was flown at 25 g/min. It was found that the heat resisting member from Example 7 withstood the thermal cycles exceeding 500 times, and suffered from no damage on the surface or delamination. On the other hand, the heat resisting member of Comparative Example 6 had delamination by the thermal cycles of 100 times due to the occurrence of cracks resulting from the surface damage. And, the heat resisting member from Reference 3 had a delaminating damage by the thermal cycles of 30 times and had most of its zirconia layer damaged when the thermal cycles exceeded 150 times.

EXAMPLE 8

An Ni—Co—Cr—Al—Y layer having a thickness of 150 μm was formed on an Ni-based super alloy base material by an atmospheric plasma spray coating. On this metal bonded layer, a first stabilized zirconia layer having a thickness of 100 μm was formed by the atmospheric plasma spray coating method using fused and crushed powder (particle diameter range: 10 to 40 μm) consisting of 8 wt % of $Y_2O_3$—$ZrO_2$. This first stabilized zirconia layer had a relative density of 93%. And, in the same way as in Example 1, the first stabilized zirconia layer formed by the atmospheric plasma spray coating method was measured for its elastic modulus and Vickers hardness. It was found that the elastic modulus was 50 GPa, and the Vickers hardness was 680 Hv.

Then, on the first stabilized zirconia layer, a second stabilized zirconia layer was formed to a thickness of 100 μm by the atmospheric plasma spray coating method using agglomerated sintered powder (particle diameter range: 10 to 88 μm) having the same composition as above. Then, a third stabilized zirconia layer was formed to a thickness of 50 μm by the atmospheric plasma spray coating method using fused and crushed powder (particle diameter range: 10 to 40 μm) having the same composition.

The second stabilized zirconia layer had a relative density of 87%, and the third stabilized zirconia layer had a relative density of 90%. Their elastic moduli and Vickers hardness were measured in the same way as in Example 1. Their elastic moduli were 40 GPa, 49 GPa, and Vickers hardness were 550 HV, 700 Hv, respectively. The third stabilized zirconia layer had surface roughness $R_z \leq 54$ μm, $R_{max} < 75$ μm, and $R_a < 6.4$ μm.

EXAMPLE 9

A heat resisting member was produced by following the procedure of Example 8 except that the third stabilized zirconia layer was changed to have a thickness of 100 μm.

References 4, 5

A heat resisting member (Reference 4) was produced by following the procedure of Example 8 except that the third stabilized zirconia layer was changed to have a thickness of 200 μm. And, a heat resisting member (Reference 5) was produced by following the procedure of Example 8 except that the second stabilized zirconia layer was changed to have a thickness of 150 μm and the third stabilized zirconia layer was not formed.

Samples taken from the respective heat resisting members of Examples 8, 9 and References 4, 5 were subjected to the thermal fatigue test with one cycle consisting of one hour at 1273 K and one hour at 298 K while blowing SiC powder having a particle diameter of about 30 μm at 2 g/L (mixed with air). It was found that the heat resisting members from Examples 8, 9 had no damage to their ceramics heat shield layer, and there was no delamination observed even after the thermal cycles of exceeding 7000 times.

On the other hand, the heat resisting member of Reference 4 had no damage to its ceramics heat shield layer but delamination occurred by the thermal cycle of 300 times. The heat resisting member of Reference 5 did not delaminate even after the thermal cycles of exceeding 7000 times as is the case of Examples 8, 9. But, its ceramics heat shield layer had the surface heavily damaged, and it was found by the SEM observation of the cross section after testing that the film thickness was decreased by about 100 μm.

It is apparent from the above-described Examples that the present invention can provide a heat resisting member of which heat fatigue resistance and thermal shock resistance are improved. Besides, the layer below the ceramics heat shield layer can be prevented from being oxidized upon obtaining a good heat shielding effect. And, it is also possible to improve the abrasion resistance and the resistance to a damage by the collision of flying substances. Thus, it is possible to provide the heat resisting member which can be used for a long time of period under working environments where a temperature is high, and thermal cycling and thermal shocks are applied.

What is claimed is:

1. A heat resisting member, comprising:
   a metal base material;
   ceramics heat shield layers formed on said metal base material, said ceramics heat shield layers including a first ceramics layer formed on said metal base material and having a film thickness of 0.1 to 200 μm, a high elastic modulus $E_1$ of 45 GPa or more, and a high hardness $H_1$, and a second ceramics layer formed on said first ceramics layer and having a film thickness of 50 to 3,000 μm, a low elastic modulus $E_2$ of less than 45 GPa and a low hardness $H_2$, wherein $H_2 < H_1$.

2. The heat resisting member according to claim 1, wherein a total film thickness of said first ceramics layer and said second ceramics layer is 100 to 3000 μm.

3. The heat resisting member according to claim 1, wherein said first ceramics layer has a relative density $D_1$, and said second ceramics layer has a relative density $D_2$ satisfying $D_2 < D_1$.

4. The heat resisting member according to claim 1, wherein said ceramics heat shield layers comprise at least one member selected from the group consisting of zirconia, alumina, alumina-titania mixed oxide, magnesia, spinel, silicon nitride, sialon, aluminum nitride, titanium nitride, and silicon carbide.

5. The heat resisting member according to claim 1, wherein said first ceramics layer is at least one member selected from the group consisting of alumina, alumina-titania mixed oxide, magnesia, and spinel, and said second ceramics layer consists of stabilized zirconia.

6. The heat resisting member according to claim 1, wherein said first ceramics layer and said second ceramics layer are formed of stabilized zirconia.

7. The heat resisting member according to claim 1, wherein said first ceramics layer has surface roughness $R_1$, and said second ceramics layer has surface roughness $R_2$ satisfying $R_2 > R_1$.

8. The heat resisting member according to claim 7, wherein said second ceramics layer has surface roughness $R_2$ which satisfies at least one of a ten-point average roughness $R_z \geq 55$ μm, a maximum height $R_{max} \geq 80$ μm, and a center line average surface $R_a \geq 7.5$ μm.

9. The heat resisting member according to claim 1, further comprising a third ceramics layer which is formed on said second ceramics layer and has a high elastic modulus $E_3$ satisfying $E_3 \geq E_2$ and a high hardness $H_3$ satisfying $H_3 > H_2$.

10. A heat resisting member, comprising:
   a metal base material;
   a metal bonded layer formed on said metal base material; and
   ceramics heat shield layers formed on said metal base material with said metal bonded layer therebetween, said ceramics heat shield layers including a first ceramics layer formed on said metal bonded layer and having a film thickness of 0.1 to 200 μm, a high elastic modulus $E_1$ of 45 GPa or more, and a high hardness $H_1$, and a second ceramics layer formed on said first ceramics layer and having a film thickness of 50 to 3,000 μm, a low elastic modulus $E_2$ of less than 45 GPa and a low hardness $H_2$, wherein $H_2 < H_1$.

11. The heat resisting member according to claim 10, wherein said first ceramics layer is a ceramics layer formed by one method selected from the group consisting of a PVD method, a CVD method, and a spin coating method, and said second ceramics layer is a ceramics layer formed by a spray coating method.

12. The heat resisting member according to claim 10, wherein said first ceramics layer is a ceramics layer formed by a high-density spray coating method using fine particle powder, and said second ceramics layer is a ceramics layer formed by a low-density spray coating method using coarse powder.

13. The heat resisting member according to claim 10, wherein said metal bonded layer consists essentially of an M—Cr—Al—Y alloy, wherein M is at least one element selected from the group consisting of Fe, Ni and Co, and an alumina layer is formed in the interface between said first ceramics layer and said metal bonded layer.

14. A heat resisting member, comprising:
   a metal base material; and
   ceramics heat shield layers formed on said metal base material, said ceramics heat shield layer including a first ceramics layer formed on said metal base material and having a film thickness of 0.1 to 200 μm, a high elastic modulus $E_1$ of 45 GPa or more, a high hardness of $H_1$, and a relative density of 88% or more, and a second ceramics layer formed on said first ceramics layer and having a film thickness of 50 to 3,000 μm, a low elastic modulus $E_2$ of less than 45 GPa, a low hardness $H_2$, and a relative density of less than 88%, wherein $H_2 < H_1$.

* * * * *